(12) United States Patent
Lee et al.

(10) Patent No.: US 8,319,764 B2
(45) Date of Patent: Nov. 27, 2012

(54) WAVE GUIDE FOR IMPROVING LIGHT SENSOR ANGULAR RESPONSE

(75) Inventors: Hsin Chin Lee, Waterloo (CA); Matthew Broga, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 791 days.

(21) Appl. No.: 12/493,329

(22) Filed: Jun. 29, 2009

(65) Prior Publication Data

US 2010/0328283 A1 Dec. 30, 2010

(51) Int. Cl.
*G09G 5/00* (2006.01)
(52) U.S. Cl. ............................. 345/207; 345/77; 345/94
(58) Field of Classification Search .............. 345/76–84, 345/87–96, 204–215
See application file for complete search history.

(56) References Cited

U.S. PATENT DOCUMENTS

| | | | |
|---|---|---|---|
| 3,880,528 A | 4/1975 | Petersen et al. | |
| 5,627,926 A | 5/1997 | Nakamura et al. | |
| 6,256,007 B1 * | 7/2001 | Walukas et al. ............... | 345/102 |
| 6,310,609 B1 * | 10/2001 | Morgenthaler ............... | 345/170 |
| 6,798,395 B1 | 9/2004 | Yamauchi et al. | |
| 7,452,118 B2 | 11/2008 | Tsuchiya | |
| 7,525,126 B2 | 4/2009 | Leatherdale et al. | |
| 2003/0127583 A1 | 7/2003 | Bechtel et al. | |
| 2005/0180169 A1 | 8/2005 | Saitoh et al. | |
| 2005/0201101 A1 | 9/2005 | Shimura | |
| 2007/0012350 A1 | 1/2007 | Kim et al. | |
| 2007/0019433 A1 | 1/2007 | Lowles | |
| 2007/0127268 A1 | 6/2007 | Chen | |
| 2007/0176081 A1 | 8/2007 | Stricklin | |
| 2008/0137004 A1 | 6/2008 | Iwasaki et al. | |
| 2008/0252823 A1 | 10/2008 | Hwang et al. | |
| 2009/0027588 A1 | 1/2009 | Medendorp, Jr. et al. | |
| 2009/0096937 A1 | 4/2009 | Bauer et al. | |
| 2009/0273949 A1 | 11/2009 | Tseng et al. | |

FOREIGN PATENT DOCUMENTS

| | | |
|---|---|---|
| DE | 4406906 A1 | 9/1995 |
| EP | 1329664 A1 | 7/2003 |
| EP | 1696259 A1 | 8/2006 |
| EP | 2053430 A2 | 4/2009 |
| JP | 61-130828 A | 6/1986 |
| JP | 07114025 A | 5/1995 |
| JP | 2005-070065 A | 3/2005 |
| WO | 2009/034515 A | 3/2009 |

OTHER PUBLICATIONS

European Patent Application No. 09164071.4 Search Report dated Dec. 17, 2009.
Novel Integrated Light-Guide Plates for Liquid Crystal Display Backlight, downloaded from http://iopscience.iop.org/1464-4258/7/3/003.
European patent application No. 09 164 071.4 Examination Report dated May 31, 2011.

(Continued)

*Primary Examiner* — Vijay Shankar
(74) *Attorney, Agent, or Firm* — Perry+Currier Inc.; Stephen J. Perry

(57) ABSTRACT

Electronic displays encounter visibility issues due to varying ambient light conditions. An ambient light sensor can be provided to sense ambient light and dynamically adjust display brightness to compensate for changes in ambient light. A wave guide for improving angular response in a light sensor is provided.

20 Claims, 10 Drawing Sheets

OTHER PUBLICATIONS

Xu, P., et al. "A novel highly integrated light guide plate using micro optical technique", Proc. SPIE, vol. 6834, pp. 683409 (2008) http://adsabs.harvard.edu/abs/2008SPIE.6834E...8X.

European Patent Application No. 10154967.3 Search Report dated Sep. 3, 2010.

Corresponding European Patent Application No. 12179390.5 Search Report dated Aug. 29, 2012.

Corresponding European Patent Application No. 09164071.4 Examination Report dated Aug. 30, 2012.

* cited by examiner

WAVE GUIDE FOR IMPROVING LIGHT SENSOR ANGULAR RESPONSE

FIELD

The present specification relates generally to light sensors and more particularly relates to a wave guide for improving angular response in a light sensor.

BACKGROUND

Flat panel displays such as liquid crystal displays (LCD) are now commonplace in portable electronic devices, computers, televisions, cellular telephones, and in other display applications. Ambient light conditions, however, can dramatically impact the display characteristics, resulting in poor display visibility. To compensate for varying ambient light conditions, and to take opportunities to reduce power consumption, ambient light sensors may be included in the displays. Such ambient light sensors attempt to detect the amount of ambient light and provide input to control circuitry which can automatically adjust the brightness of the display, according to the amount of sensed ambient light.

DETAILED DESCRIPTION OF THE EMBODIMENTS

An aspect of this specification provides a display assembly comprising: a display; a light sensor module mounted proximally to said display; a controller connected to said light sensor module and configured to receive an electronic signal representing a measurement of ambient light incident on said display; said controller connected to said display and configured to adjust brightness of said display based on said electronic signal; said light sensor module comprising a window for transmitting ambient light; a light sensor for receiving said ambient light and configured to generate said electronic signal; a wave guide comprising a textured surface disposed between said window and said light sensor; said textured surface having a geometric structure; said geometric structure configured according to a material and a thicknesses of said window; said geometric structure further configured to guide ambient light travelling through said window onto said light sensor such that an intensity of ambient light that strikes said sensor varies substantially proportionally according to a function comprising a cosine of an angle of incidence of ambient light striking said window.

The geometric structure can be further configured such that said ambient light strikes said sensor at an angle that is substantially normal to said sensor regardless of said angle of incidence.

The display assembly can further comprise a substrate; said textured surface applied to said substrate; said substrate for mechanically affixing said wave guide to said window. The substrate can be affixed via an adhesive. The geometric structure can be further configured according to a material and thickness of said substrate.

The textured surface can be integrally formed into said window.

The textured surface can comprise a plurality of bosses.

The bosses can be trapeziums, partial-spheroids, or four-sided pyramids.

The bosses can be regularly spaced, or irregularly spaced.

The textured surface can be made from one of polymethyl methacrylate, polyethylene terephthalate, acrylic, or epoxy.

The wave guide can be made from a material having a refractive index of between about 1.4 and about 1.7.

The light sensor module can further comprise a light emitter configured to emit light at a first angle; said wave guide configured to scatter light emitted from said light emitter out of said window at angle wider than said first angle.

The display assembly can be configured for incorporation into a portable electronic device and said light emitter is configured to indicate a status of said portable electronic device.

Another aspect of the specification provides a light sensor module according to any of the foregoing.

Another aspect of the specification provides a wave guide according to any of the foregoing.

Figure 1:
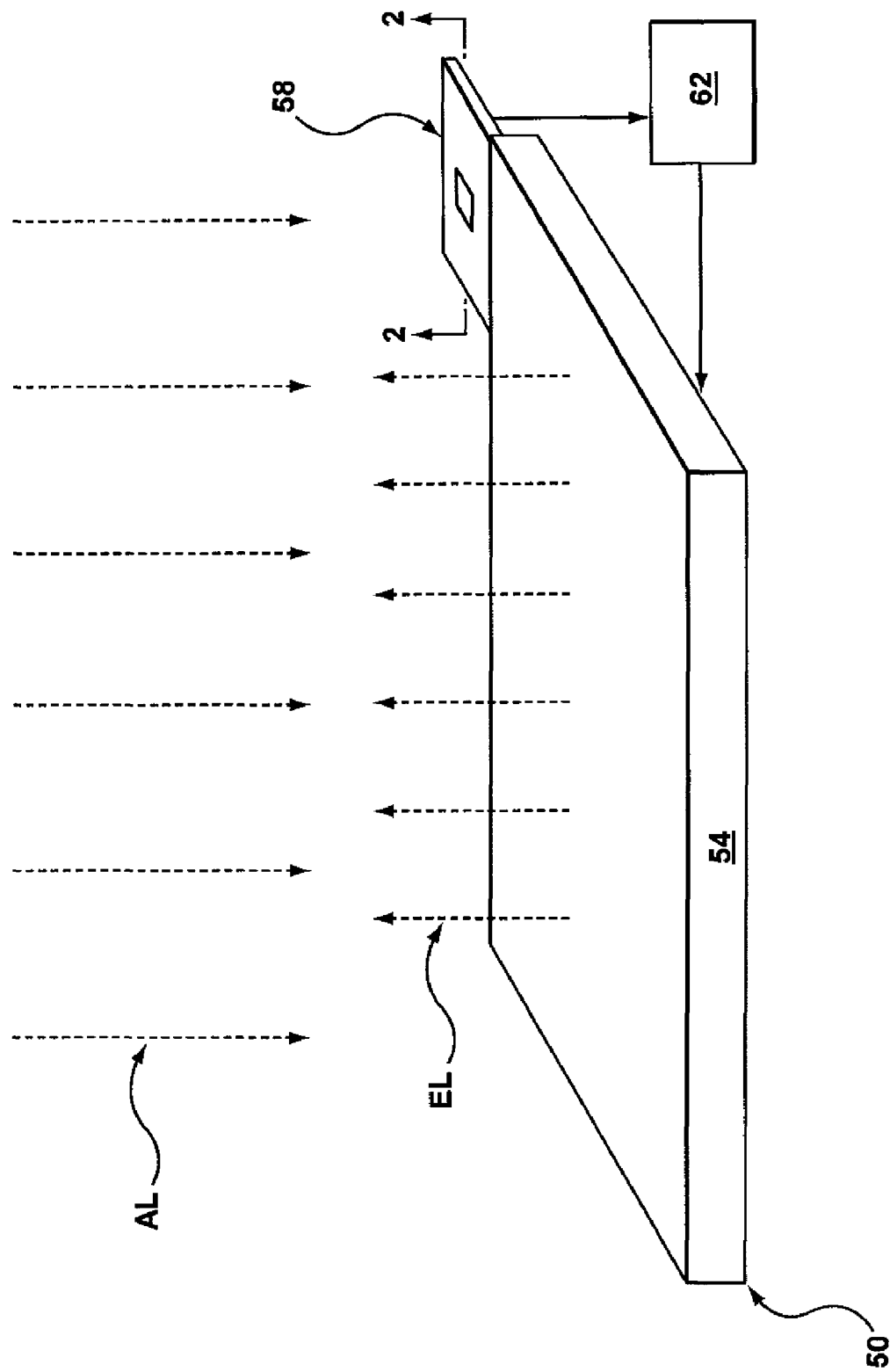
FIG. 1 is an isometric representation of a display assembly.

Referring now to FIG. 1, a display assembly is indicated generally at 50. Display assembly 50 comprises a display 54, a light sensor module 58, and a controller 62. Display assembly 50 can be incorporated into any electronic apparatus having a display, including but not limited to portable electronic devices, computers, televisions, cellular telephones, desktop telephones, and major appliances.

Display 54 comprises one or more light emitters such as an array of light emitting diodes (LED), liquid crystals, plasma cells, or organic light emitting diodes (OLED). Other types of light emitters are contemplated. Such light emitters, when activated by controller 62, produce emitted light, as indicated by the arrows labeled "EL" in the Figures. Emitted light EL is shown as being emitted substantially normally from the surface of display 54, although the actual viewing range can be much wider.

Display 54 is also subject to incident ambient light AL. In FIG. 1, ambient light AL is shown as incident in a direction that is substantially normal to the surface of display 54. Those skilled in the art will appreciate that ambient light AL can reduce the visibility of emitted light EL. Controller 62 is therefore configured to receive an electrical signal from sensor module 58 representing an intensity of ambient light AL and to adjust the brightness of emitted light EL to compensate for reduced visibility of emitted light EL due to ambient light AL. As will be discussed further below, display assembly 50 is configured to respond to ambient light AL that is incident from a range of different angles.

Figure 2:
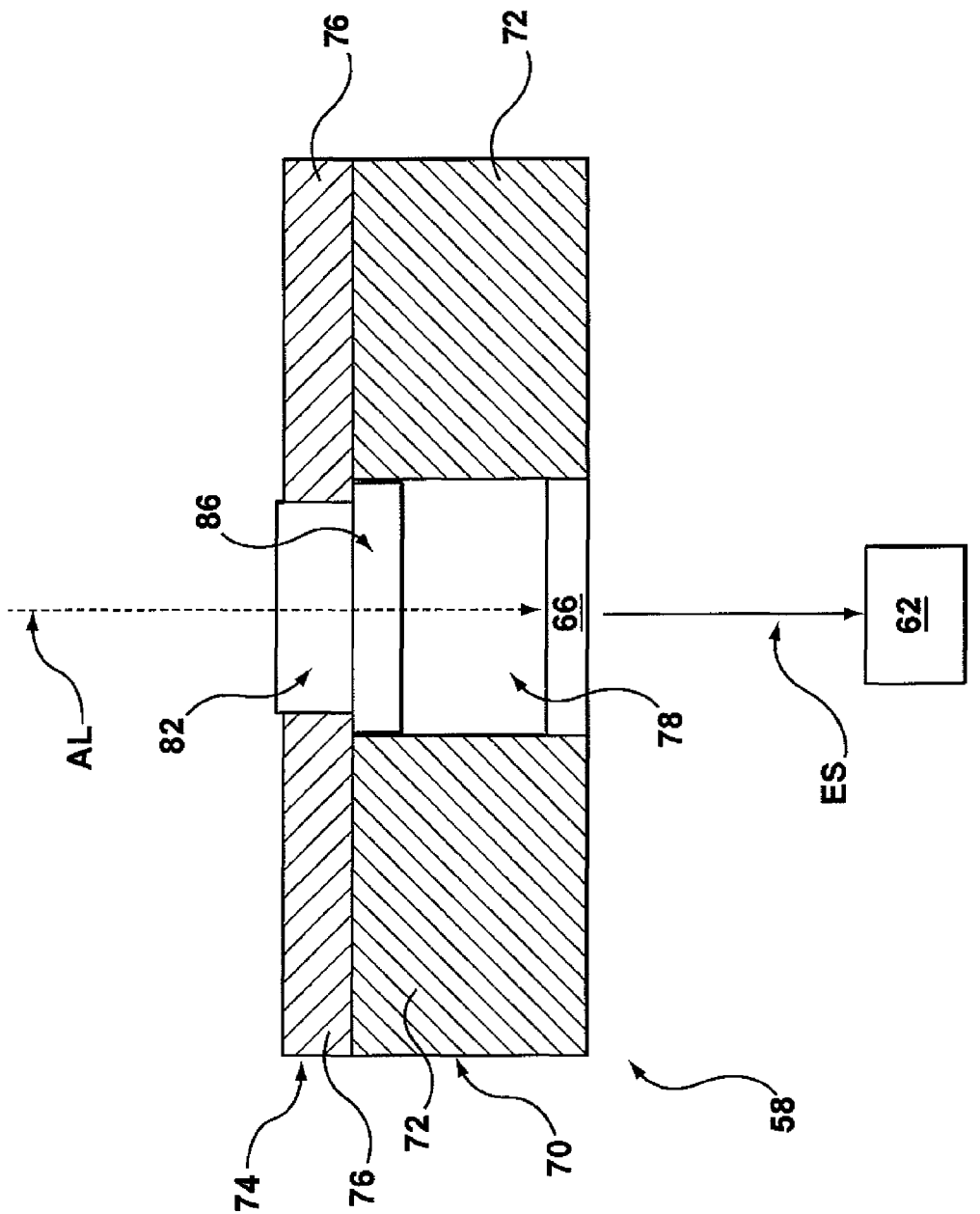
FIG. 2 is a schematic cross-sectional representation of the light sensor of the assembly of FIG. 1, the cross-section being taken along the dashed-lines indicated as 2-2 in FIG. 1.

As best seen in FIG. 2, light sensor module 58 comprises a light sensor or other type of photodetector 66 that is configured to convert ambient light AL that is incident on photodetector 66 into an electrical signal ES. Electrical signal ES has a voltage or other electrical characteristic that is generally proportional to the intensity (expressed as, for example, in units of lux) of ambient light AL that lands on photodetector 66. Electrical signal ES is received at controller 62 which is configured to brighten or dim display 54 accordingly.

Light sensor module 58 also comprises a housing 70 and a cover 74. Housing 70 comprises a chassis 72 that is shaped so as to define a light transmissive chamber 78, and photodetector 66 is disposed within the end of chamber 78 that is opposite to cover 74. Chamber 78, in a present embodiment, contains air and is therefore transmissive of ambient light EL.

Cover 74 comprises a frame 76 that overlays chassis 72. Frame 72 is also shaped to define a window 82. A wave guide 86 is disposed within chamber 78 between window 82 and photodetector 66. In a present embodiment, wave guide 86 abuts window 82. As will be discussed in greater detail below, wave guide 86 can be a separate item from window 82, or wave guide 86 can be integrally formed into window 82.

Chassis 72 and frame 76 are substantially mechanical in function and therefore can be of any suitable material to achieve the desired mechanical characteristics of the corresponding display assembly 50 application. For example, where display assembly 58 is part of a display in a portable electronic device, chassis 72 and frame 76 will be made from materials and dimensioned to be rugged enough to mechanically support window 82, wave guide 86 and photodetector 66, within light sensor module 58, and also be rugged enough to withstand dropping or other types of physical blows to which a portable electronic device can be commonly subjected.

By the same token, window 82, wave guide 86, chamber 78 and photodetector 66 are substantially optical in function, (or in the case of photodetector 66, electro-optical), and as will be discussed further below, are therefore selected from materials that provide the desired optical, (or electro-optical) characteristics. Again, within the context of display assembly 58 being used within a portable electronic device, window 82, wave guide 86 and photodetector 66 are also configured to provide a certain degree of mechanical ruggedness, again so that the entire display assembly 50 can withstanding the physical blows to which a portable electronic device can be commonly subjected.

As will be discussed further below, wave guide 86 can be physically integrated into window 82, or each can be separate items which are mechanically affixed to each other (e.g. via an adhesive) at the time of assembly.

Figure 3:
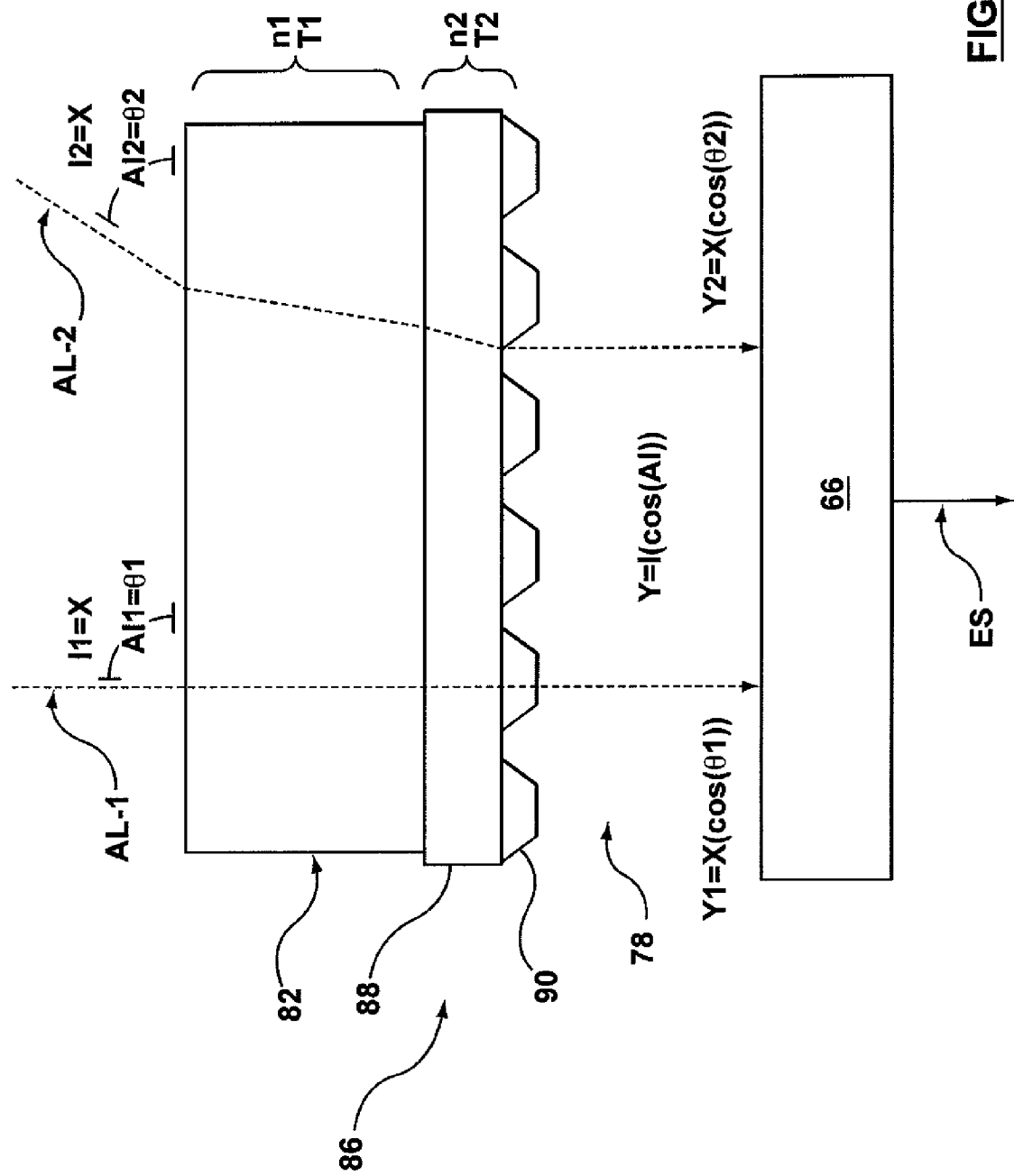
FIG. 3 shows the window, wave guide and photodetector of FIG. 2 in greater detail.

FIG. 3 shows an embodiment of window 82, wave guide 86 and photodetector 86 in greater detail. In FIG. 3, wave guide 86 includes a substrate 88 and a textured surface 90. FIG. 3 also shows two separate representative beams of ambient light AL-1, and AL-2.

Ambient light AL-1 is shown as incident at an angle Al1 that is normal to the surface of window 82. Angle Al1 is assigned the variable $\Theta 1$ in FIG. 3, where $\Theta 1$ equals ninety degrees. Ambient light AL-1 is also shown as having intensity I1 when ambient light I1 strikes the surface of window 82. Intensity I1 is assigned the variable X in FIG. 3. I1 can be expressed in units of lux. For purposes of explaining this embodiment, X can be any value associated with ambient light conditions.

Ambient light AL-2 is shown as incident at an angle Al2 that is less than ninety degrees to the surface of window 82. Angle Al2 is assigned the variable $\Theta 2$ in FIG. 3. Ambient light AL-2 is also shown as having intensity I2 when ambient light I2 strikes the surface of window 82. For purposes of explaining this embodiment, I2 is deemed to equal I1, and therefore I1=X.

Window 82 can be characterized in terms of its material with an associated index of refraction n1, and having a particular thickness T1. The index of refraction n1 of window 82 is represented in FIG. 3 by the change in angle of ambient light AL-2 as ambient light AL-2 travels through window 82.

Substrate 88 can be also characterized in terms of its material with an associated index of refraction n2, and having a particular thickness T2. The index of refraction n2 of substrate 88 is represented in FIG. 3 by the change in angle of ambient light AL-2 as ambient light AL-2 travels through substrate 88.

What is not represented in FIG. 3, but will occur to those of skill in the art, are the reflections at the junctions between different adjacent materials. Thus, a certain amount of ambient light AL-1 will be internally reflected as ambient light AL-1 enters and exits window 82, and enters and exits substrate 88, and enters and exits textured surface 90. Accordingly, in an actual implementation, the actual intensity of ambient light AL-1 and ambient light AL-2 entering chamber 78 will be less than intensity I1 and intensity I2 due to attenuation and losses resulting from passing through window 82 and wave guide 86. Such attenuation is not represented in FIG. 3 for purposes of simplifying explanation.

Textured surface 90 is defined by a three-dimensional geometric structure that is configured based on the materials and thicknesses of window 82 and substrate 88, such that the intensity of ambient light that strikes photodetector 66 varies substantially proportionally to the cosine of the angle of incidence of the ambient light striking window 82. Additionally, the three-dimensional geometric structure of textured surface 90 is configured such that ambient light strikes photodetector 66 at an angle that is substantially normal to photodetector 66, regardless of the angle that the ambient light actually strikes window 82.

(It should now be apparent that in certain configurations, textured surface 90 can be integrally formed with window 82, thereby obviating the need for substrate 88. In this configuration, the same principles as the previous paragraph apply, except that only the material and thickness of window 82 need be considered.)

In FIG. 3, the intensity of ambient light AL that strikes the surface of senor 66 is represented by the variable Y. Thus, in mathematical terms, the geometric structure of textured surface is configured according the following function:

$$Y = I(\cos(Al)) \qquad \text{Function 1:}$$

Where:

Y is the intensity of ambient light that strikes the surface of photodetector 66

I is the intensity of light that strikes the surface of window 82

Al is the angle of incidence of light as it strikes the surface of window 82.

Figure 4:
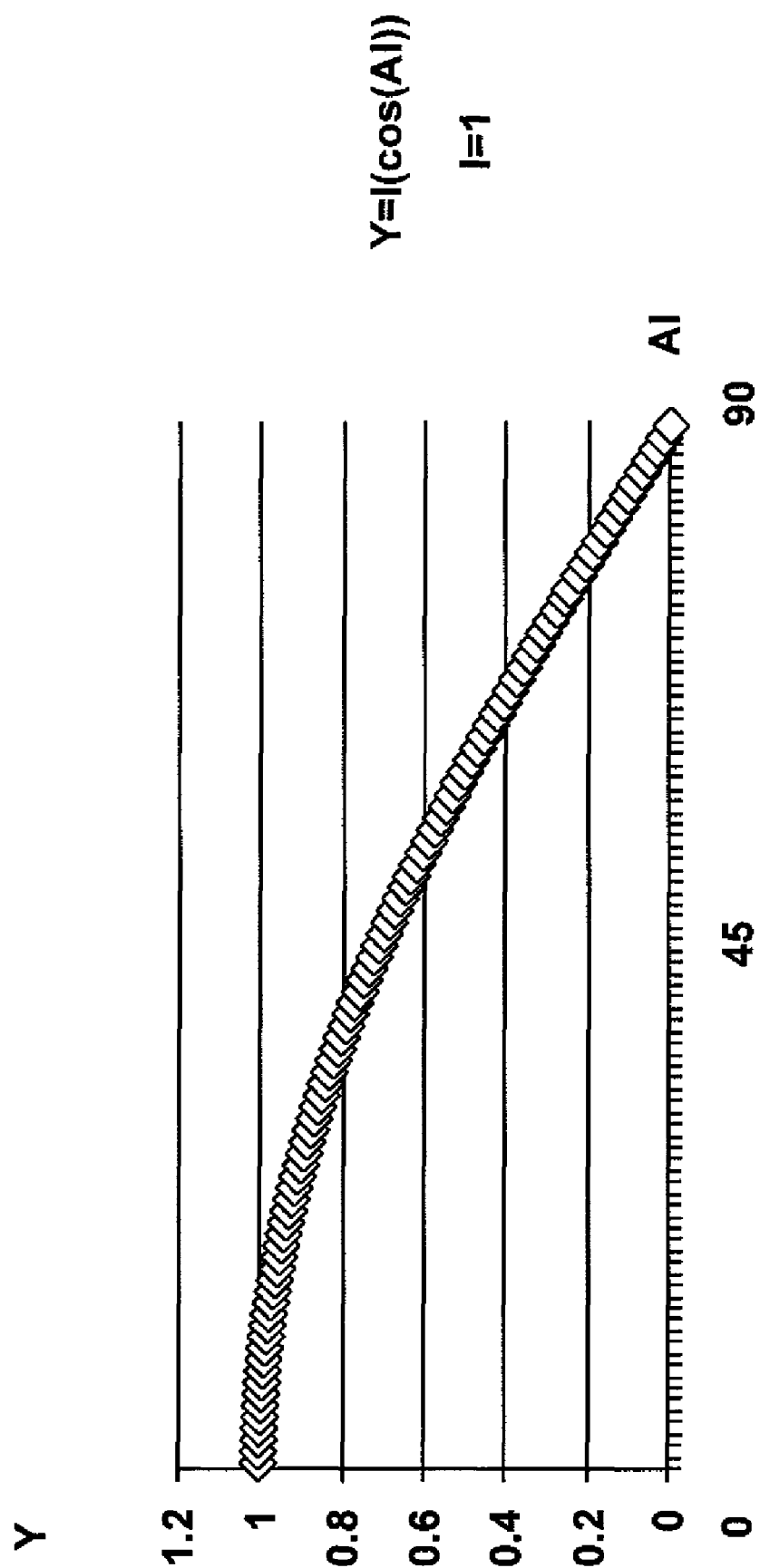
FIG. 4 shows an idealized response curve of the intensity of light that reaches the sensor of FIG. 3 as a result of the configuration of the wave guide of FIG. 3.

A graph of plotting Function 1, where I=1, is shown in FIG. 4.

Various materials for wave guide 86 are contemplated, including polycarbonate, polymethyl methacrylate, polyethylene terephthalate, acrylic, and epoxy. As desired for a particular configuration, such materials can also be used for window 82.

Presently, any material can be chosen that has suitable mechanical properties and has a refractive index of between about 1.4 and about 1.7.

Presently, textured surface 90 is configured for range of the visible electro-magnetic spectrum, and certain wavelengths at the periphery of that spectrum, specifically wavelengths of between about 350 nanometers and about 900 nanometers.

Figure 5:
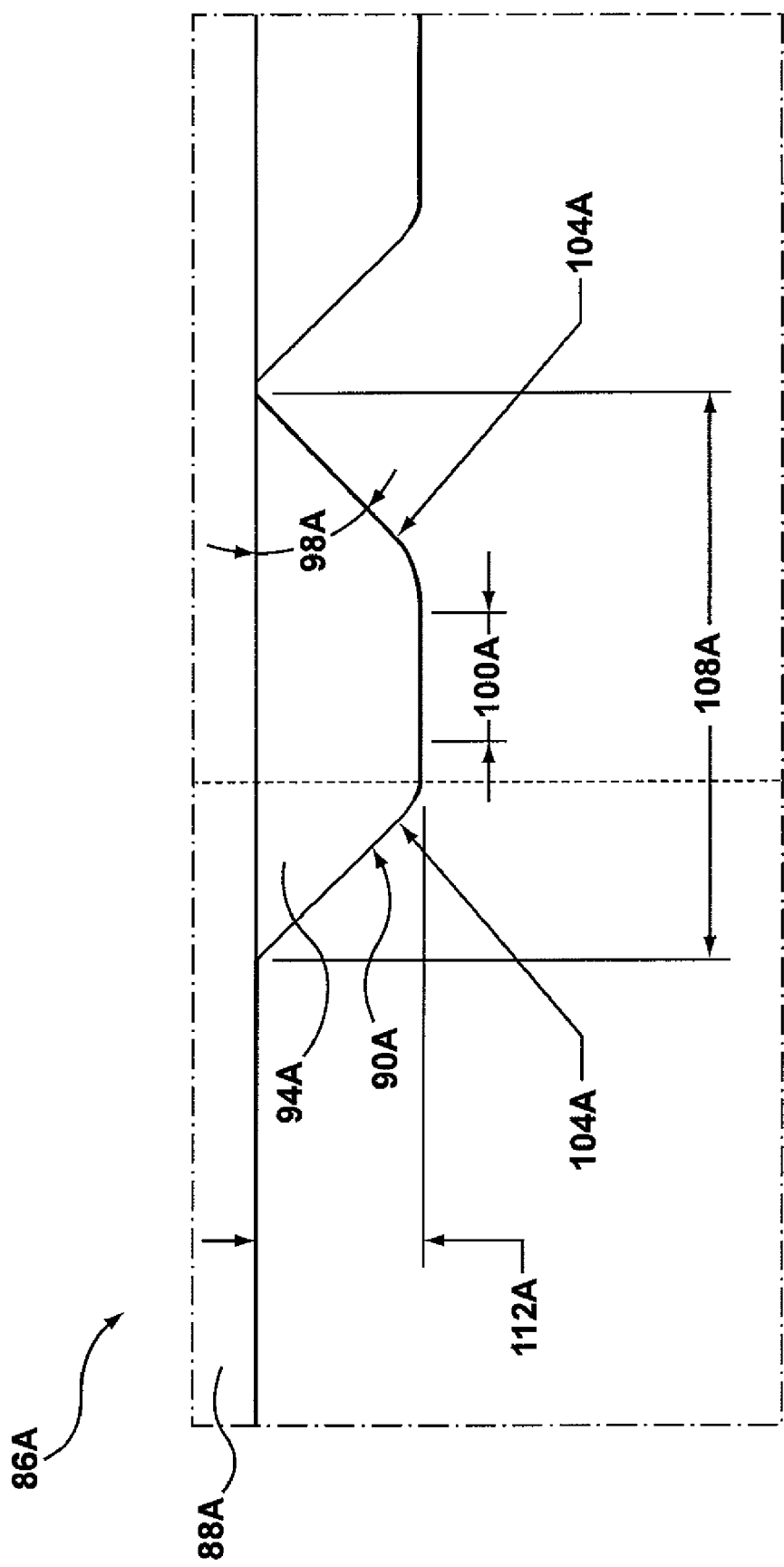
FIG. 5 shows a first exemplary configuration of the wave guide of FIG. 3.

FIG. 5 shows a non-limiting exemplary embodiment of a specific geometric structure for textured surface 90, although in FIG. 5 the textured surface of this specific embodiment is indicated at reference 90A, within a specific wave guide 86A. Textured surface 90A is thus comprised of a plurality of bosses in the form of trapeziums 94A. While FIG. 5 shows each trapezium 94A as aligned, in variations the trapeziums can be irregularly aligned.

The thickness of textured surface 90A is, in the present embodiment, between about 0.001 millimeters and about five millimeters, and the material for textured surface 90A can be polycarbonate, polymethyl methacrylate, polyethylene terephthalate, acrylic, or epoxy. In a present embodiment substrate 88A is integral with window 82A. In the present embodiment, substrate 88A is etched directly onto window 82A. Substrate 88A has a thickness of about 0.05 millimeters to about two millimeters. Window 82A has a thickness of about 0.1 millimeters to about five millimeters. Table I shows the various dimensions for each trapezium 94A.

TABLE I

Dimensions for Trapezium 94A

| Dimension reference | Type | Dimension | Unit | Tolerance |
|---|---|---|---|---|
| 98A | Angle | 48 | Degree | +/−12 |
| 100A | Length | 0.01 | mm | +5/−0.01 |
| 104A | Radius | 0.01 | mm | +0.5/−0.01 |
| 108A | Length | 0.05 | mm | +5/−0.04 |

Figure 6:
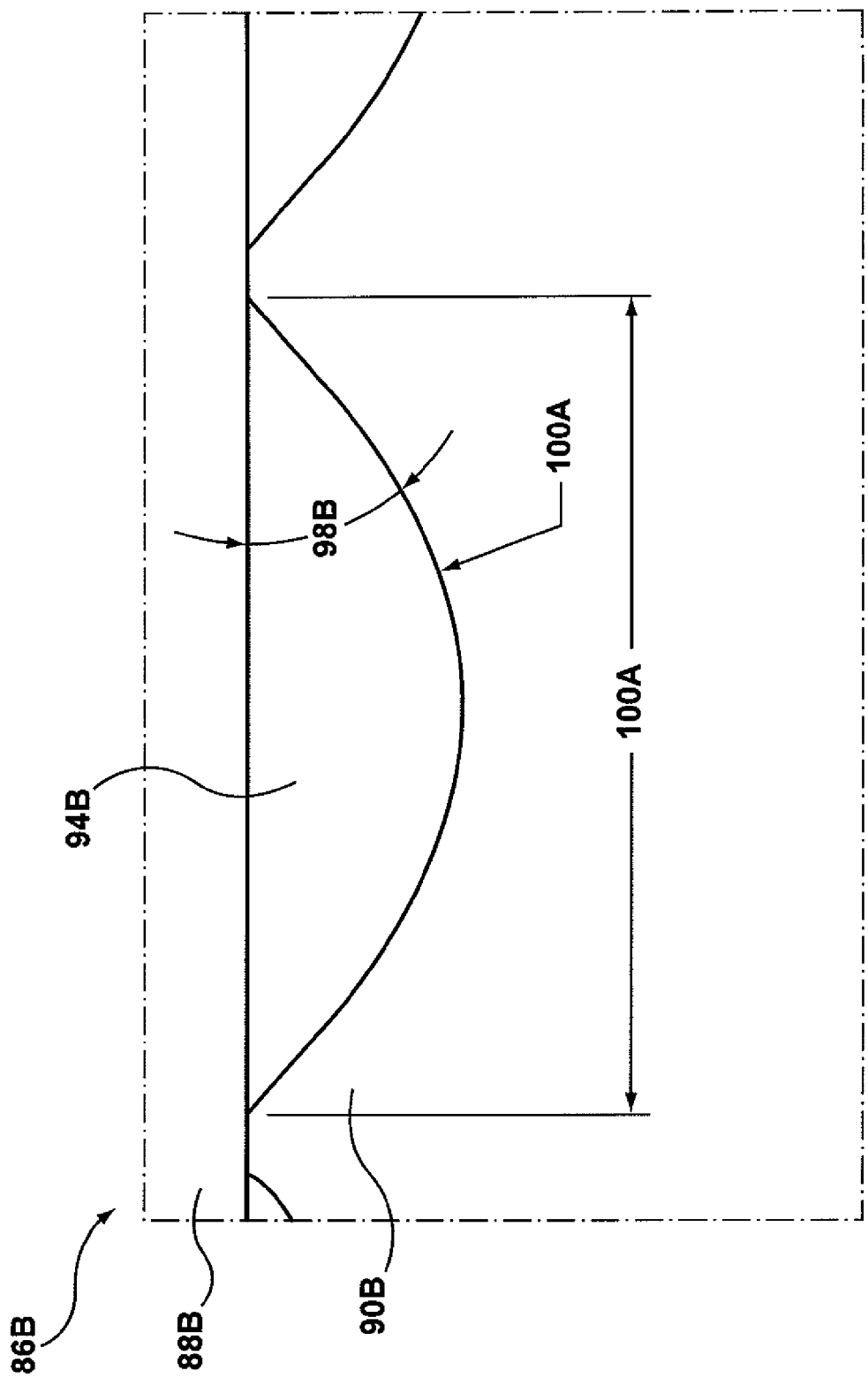
FIG. 6 shows a second exemplary configuration of the wave guide of FIG. 3.

FIG. 6 shows another non-limiting exemplary embodiment of another specific geometric structure for textured surface 90, although in FIG. 6 the textured surface of this specific embodiment is indicated at reference 90B, within a specific wave guide 86B. Textured surface 90B is thus comprised of a plurality of bosses in the form of partial-spheroids 94B. While FIG. 6 shows each semi-spheroid 94B as aligned, in variations the partial-spheroids 94B can be irregularly aligned.

The thickness of textured surface 90B is, in the present embodiment, between about 0.001 millimeters and about five millimeters, and the material for textured surface 90B can be polycarbonate, polymethyl methacrylate, polyethylene terephthalate, acrylic, or epoxy. In a present embodiment substrate 88B is integral with window 82B. In the present embodiment, substrate 88B is etched directly onto window 82B. Substrate 88B has a thickness of about 0.05 millimeters to about two millimeters. Window 82B has a thickness of about 0.1 millimeters to about five millimeters. Table II shows the various dimensions for each partial-spheroid 94B.

TABLE II

Dimensions for Partial-Spheroid 94B

| Dimension reference | Type | Dimension | Unit | Tolerance |
|---|---|---|---|---|
| 98B | Angle | 44.91 | Degrees | +/−15 |
| 100B | Length | 0.03 | mm | +5/−0.03 |
| 104B | Radius | 0.01 | mm | +5/−0.01 |

Figure 7:
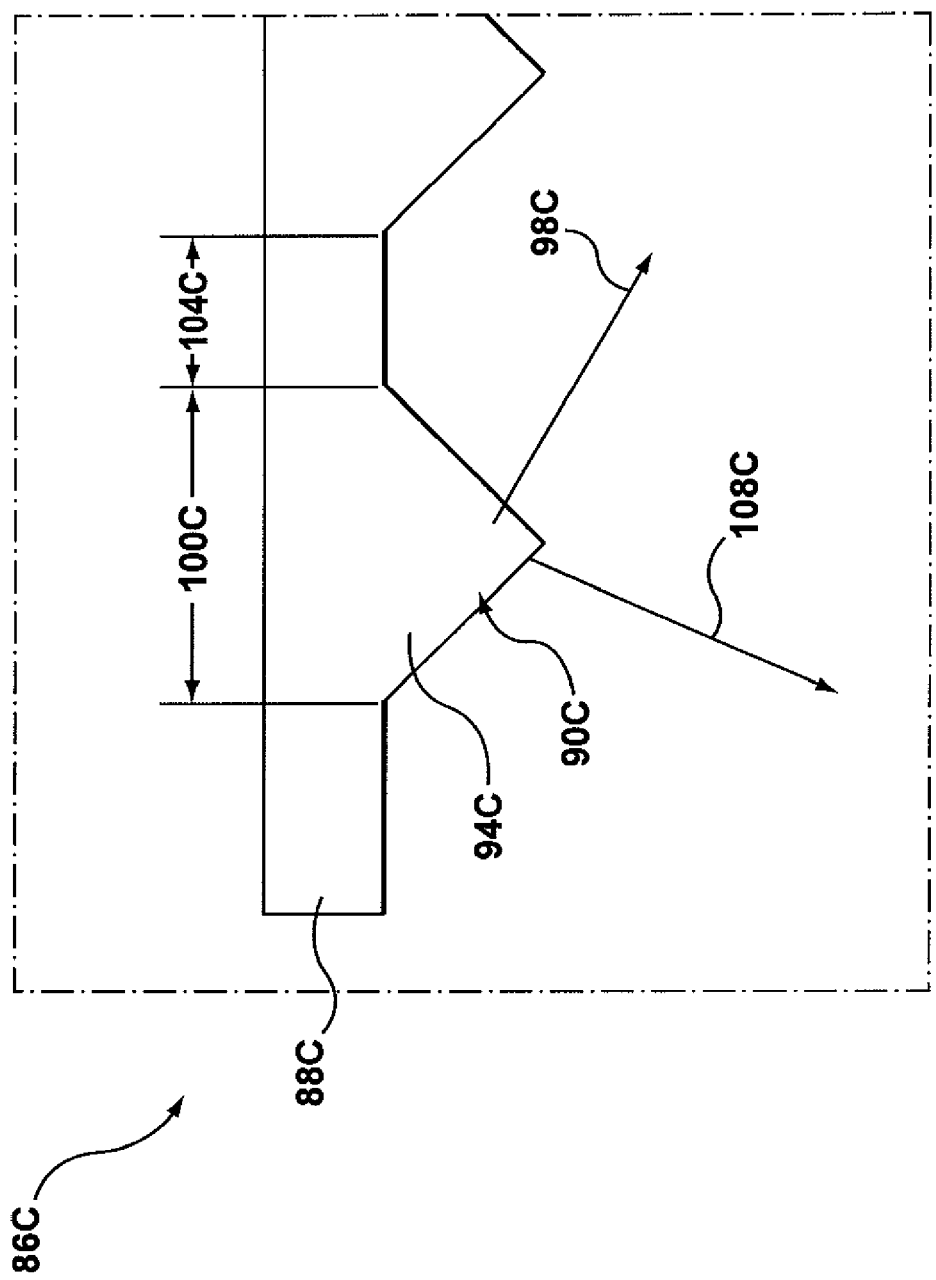
FIG. 7 shows a third exemplary configuration of the wave guide of FIG. 3.

FIG. 7 shows another non-limiting exemplary embodiment of another specific geometric structure for textured surface 90, although in FIG. 7 the textured surface of this specific embodiment is indicated at reference 90C, within a specific wave guide 86C. Textured surface 90C is thus comprised of a plurality of bosses in the form of four-sided pyramids 94C. While FIG. 7 shows each four-sided pyramid 94C as aligned, in variations the four-sided pyramids 94C can be irregularly aligned.

The thickness of textured surface 90C is, in the present embodiment, between about 0.001 millimeters and about five millimeters, and the material for textured surface 90B can be polycarbonate, polymethyl methacrylate, polyethylene terephthalate, acrylic, or epoxy. In a present embodiment substrate 88C is integral with window 82C. In the present embodiment, substrate 88C is etched directly onto window 82C. Substrate 88C has a thickness of about 0.05 millimeters to about two millimeters. Window 82C has a thickness of about 0.1 millimeters to about five millimeters. Table III shows the various dimensions for each four-sided pyramid 94C.

TABLE III

Dimensions for Four-Sided pyramids 94C

| Dimension reference | Type | Dimension | Unit | Tolerance |
|---|---|---|---|---|
| 98C | Angle | 75 | Degrees | +15/−15 |
| 100C | Length | 0.018 | millimeters | +5/−0.015 |
| 104C | Length (between each pyramid) | 0.015 | millimeters | +5/−0.015 |
| 108C | Radius | Zero | millimeters | +/−2 |

Figure 8:
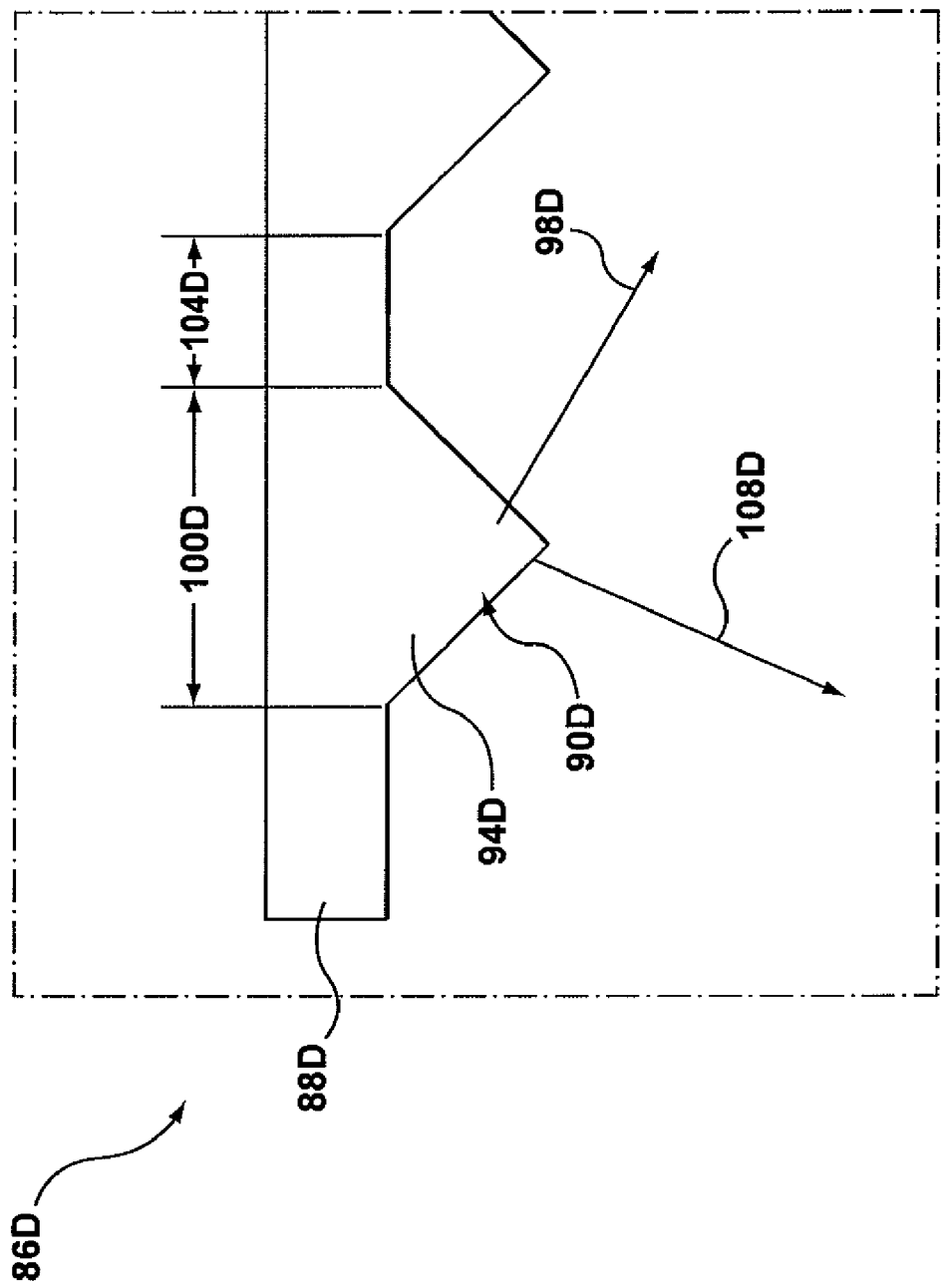
FIG. 8 shows a fourth exemplary configuration of the wave guide of FIG. 3.

FIG. 8 shows another non-limiting exemplary embodiment of another specific geometric structure for textured surface 90, although in FIG. 8 the textured surface of this specific embodiment is indicated at reference 90D, within a specific wave guide 86D. Textured surface 90D is thus comprised of a plurality of bosses in the form of four-sided pyramids 94D. While FIG. 8 shows each four-sided pyramid 94D as aligned, in variations the four-sided pyramids 94C can be irregularly aligned.

The thickness of textured surface 90D is, in the present embodiment, between about 0.001 millimeters and about five millimeters, and the material for textured surface 90D can be polycarbonate, polymethyl methacrylate, polyethylene terephthalate, acrylic, or epoxy. In a present embodiment substrate 88D is integral with window 82D. In the present embodiment, substrate 88D is etched directly onto window 82D. Substrate 88D has a thickness of about 0.05 millimeters to about two millimeters. Window 82D has a thickness of about 0.1 millimeters to about five millimeters. Table IV shows the various dimensions for each four-sided pyramid 94D.

TABLE IV

Dimensions for Four-Sided pyramids 94D

| Dimension reference | Type | Dimension | Unit | Tolerance |
|---|---|---|---|---|
| 98D | Angle | 86 | Degrees | +/−10 |
| 100D | Length | 0.03 | millimeters | +5/−0.03 |
| 104D | Length (between each pyramid) | 0.02 | millimeters | +5/−0.02 |
| 108D | Radius | 0.015 | millimeters | +2/−0.015 |

Figure 9:
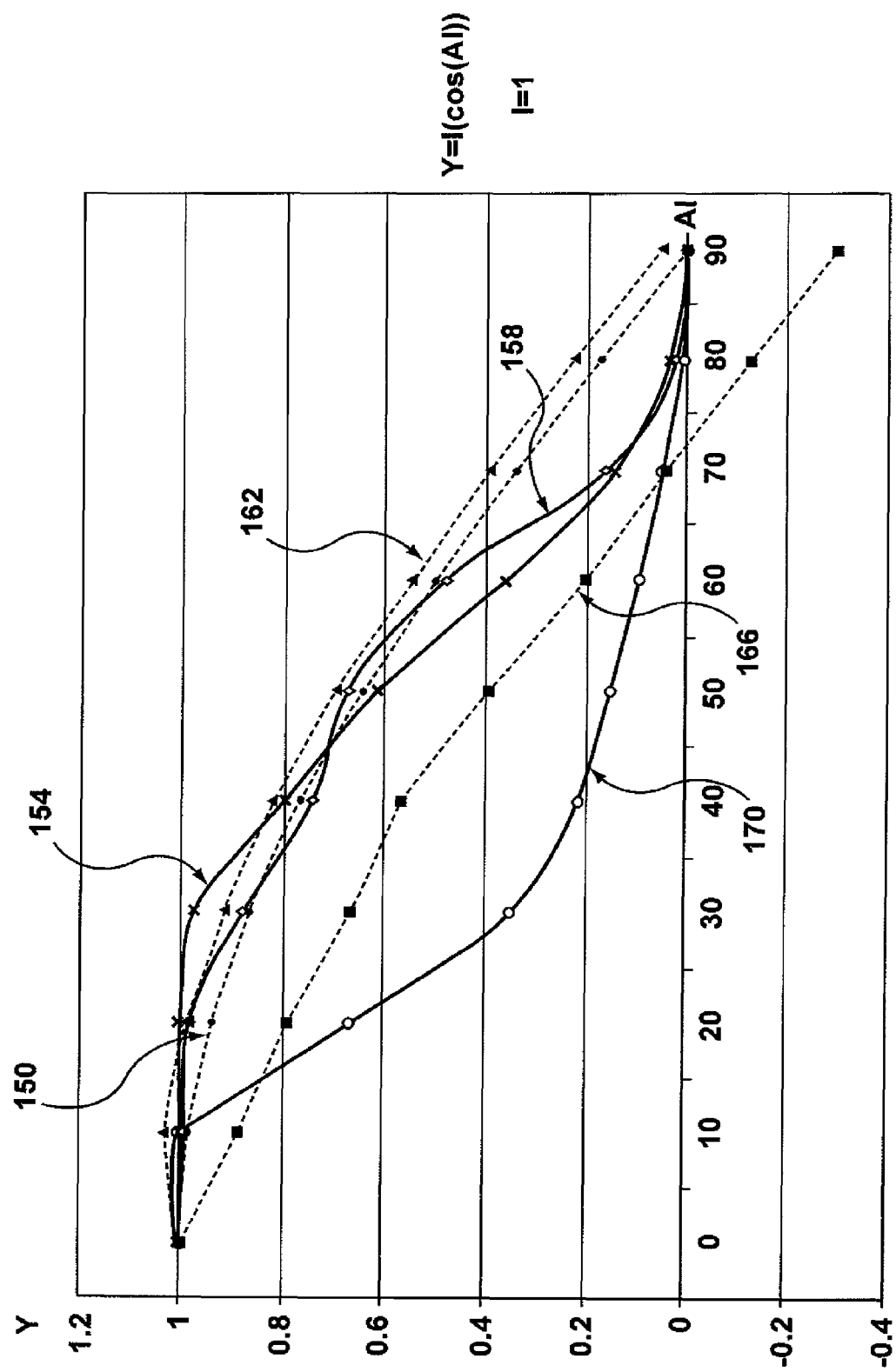
FIG. 9 shows a plurality of further response curves.

It is to be understood that Function 1 in FIG. 4 is an idealized target profile for Y (where Y varies to Intensity I and Angle of Incidence AI) in the establishment of a configuration of textured surface 90. The actual function that can result in relation to a particular geometric structure of textured surface 90 has a range of acceptable deviation from Function 1, such that in certain embodiments the geometric structure of textured surface 90 results in a profile that substantially conforms with Function 1, without exactly matching Function 1. FIG. 9 shows a variety of different curves to illustrate. In FIG. 9, curve 150 is the curve that corresponds with Function 1 and as shown in FIG. 4. Curve 154 shows the response curve associated with textured surface for four-sided pyramid 94C when ambient light AL is incident along the plane shown in FIG. 3. Curve 158 shows the response curve associated with textured surface for four-sided pyramid 94C when ambient light is incident along the plane that is normal to the plane shown in FIG. 3.

Again recall that curve 150 is the curve that corresponds with Function 1 and as shown in FIG. 4. Ranges of design tolerances for curve 150 are also proposed herein, including curve 162 shows an exemplary upper tolerance boundary for design specifications for the geometric structure of textured surface 90, while curve 166 shows an exemplary lower tolerance boundary for design specifications the geometric structure of textured surface 90. Presently, an upper tolerance from Function 1 can be about positive five percent (+5%) a lower tolerance from Function 1 can be about negative five percent (−5%).

Curve 170 shows a measured response for a prior art device that does not include wave guide 86. The prior art device is a BlackBerry Bold™ from Research in Motion Inc., of Waterloo, Ontario Canada.

Variations the foregoing are contemplated. For example, chamber 78 can be a vacuum or filled with a light transmissive medium. However, adjustments to wave guide 86 will be made to accommodate the index of refraction and other optical characteristics whatever medium is used within chamber 78. As another example the means by which light sensor module 58 incorporates wave guide 86 is not particularly limited. For example, wave guide 86 can be produced as a separate item that is affixed to window 82. Alternatively, textured surface 90 can be formed directly on the surface of window 82 that is nearest to chamber 78, thereby obviating the need for substrate 88 altogether.

Figure 10:
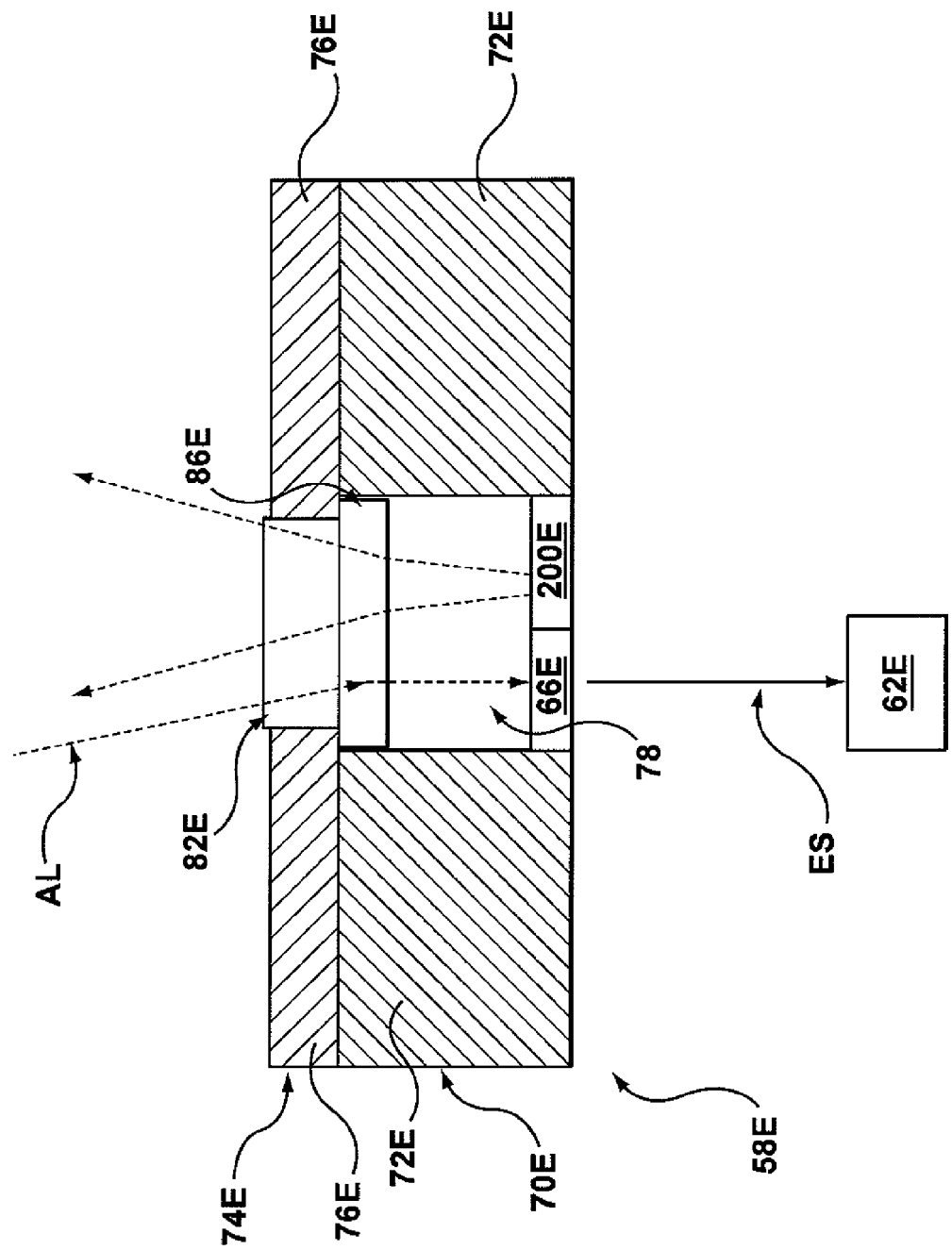
FIG. 10 shows a light sensor assembly as a variation on the assembly of FIG. 2.

A still further variation is shown in FIG. 10, which shows a light sensor module 58E. Light sensor module 58E includes many of the same components of light sensor module 58, and accordingly like elements bear like references, except followed by the suffix "E". However, in light sensor module 58E, photodetector 66E is reduced in size to allow for a light emitter such as a light emitting diode (LED) 200E. Light sensor module 58E can be incorporated into a portable electronic device where LED 200E can be used as an indicator light. The indicator light can be used, for example, to indicate a low battery condition of the device. Other functions for the indicator light are contemplated. For example, where the portable electronic device includes wireless telephony or email messaging capability, then LED 200E can be used to indicate the presence of a wireless network. LED 200E can also be of the type that is configured to generate multiple colours. In module 58E, wave guide 86E has two functions: first to direct ambient light onto photodetector 66E as previously discussed, and second to help scatter light emitted from LED 200E out of window 82E across a wider range of angles.

While certain specific embodiments have been discussed herein, combinations, subsets and variations of those embodiments are contemplated. It is the claims attached hereto that define the scope of time-limited exclusive privilege of this specification.

The invention claimed is:

1. A display assembly comprising:
a display;
a light sensor module mounted proximally to said display;
a controller connected to said light sensor module and configured to receive an electronic signal representing a measurement of ambient light incident on said display;
said controller connected to said display and configured to adjust brightness of said display based on said electronic signal;
said light sensor module comprising:
a window for transmitting ambient light;
a light sensor for receiving said ambient light and configured to generate said electronic signal;
a wave guide comprising a textured surface disposed between said window and said light sensor;
said textured surface having a geometric structure;
said geometric structure configured according to a material and a thicknesses of said window;
said geometric structure further configured to guide ambient light travelling through said window onto said light sensor such that an intensity of ambient light that strikes said sensor varies substantially proportionally according to a function comprising a cosine of an angle of incidence of ambient light striking said window.

2. The display assembly of claim 1 wherein said geometric structure is further configured such that said ambient light strikes said sensor at an angle that is substantially normal to said sensor regardless of said angle of incidence.

3. The display assembly of claim 1 further comprising a substrate; said textured surface applied to said substrate; said substrate for mechanically affixing said wave guide to said window.

4. The display assembly of claim 3 wherein said substrate is affixed via an adhesive.

5. The display assembly of claim 3 wherein said geometric structure is further configured according to a material and thickness of said substrate.

6. The display assembly of claim 1 wherein said textured surface is integrally formed into said window.

7. The display assembly of claim 1 wherein said textured surface comprises a plurality of bosses.

8. The display assembly of claim 7 wherein said bosses are trapeziums.

9. The display assembly of claim 7 wherein said bosses are partial-spheroids.

10. The display assembly of claim 7 wherein said bosses are four-sided pyramids.

11. The display assembly of claim 7 wherein the bosses are regularly spaced.

12. The display assembly of claim 7 wherein the bosses are irregularly spaced.

13. The display assembly of claim 1 wherein said textured surface is made from one of polymethyl methacrylate, polyethylene terephthalate, acrylic, or epoxy.

14. The display assembly of claim 1 wherein said wave guide is made from a material having a refractive index of between about 1.4 and about 1.7.

15. The display assembly of claim 1 wherein said function has a lower tolerance of about −5%.

16. The display assembly of claim 1 wherein said function has an upper tolerance of about +5%.

17. The display assembly of claim 1 wherein said light sensor module further comprises a light emitter configured to emit light at a first angle; said wave guide configured to scatter light emitted from said light emitter out of said window at angle wider than said first angle.

18. The display assembly of claim 17 wherein said display assembly is configured for incorporation into a portable electronic device and said light emitter is configured to indicate a status of said portable electronic device.

19. A light sensor module comprising: a window for transmitting ambient light; a light sensor for receiving said ambient light; a wave guide comprising: a textured surface disposed between said window and said light sensor; said textured surface having a geometric structure; said geometric structure configured according to a material and a thicknesses of said window; said geometric structure further configured to guide ambient light travelling through said window onto said light sensor such that an intensity of ambient light that strikes said sensor varies substantially proportionally according to a function comprising a cosine of an angle of incidence of ambient light striking said window; wherein said wave guide is made from a material having a refractive index of between about 1.4 and about 1.7; and wherein said function has a lower tolerance of about −5% and an upper tolerance of about +5%.

20. A wave guide comprising: a textured surface for positioning between a window and a light sensor; said textured surface having a geometric structure; said geometric structure configured according to a material and a thicknesses of said window; said geometric structure further configured to guide ambient light travelling through said window onto said light sensor such that an intensity of ambient light that strikes said sensor varies substantially proportionally according to a function comprising a cosine of an angle of incidence of ambient light striking said window; wherein said wave guide is made from a material having a refractive index of between about 1.4 and about 1.7; and wherein said function has a lower tolerance of about −5% and an upper tolerance of about +5%.

* * * * *